April 12, 1938.   R. MENDOZA   2,113,703
PROJECTION SCREEN
Filed April 21, 1936
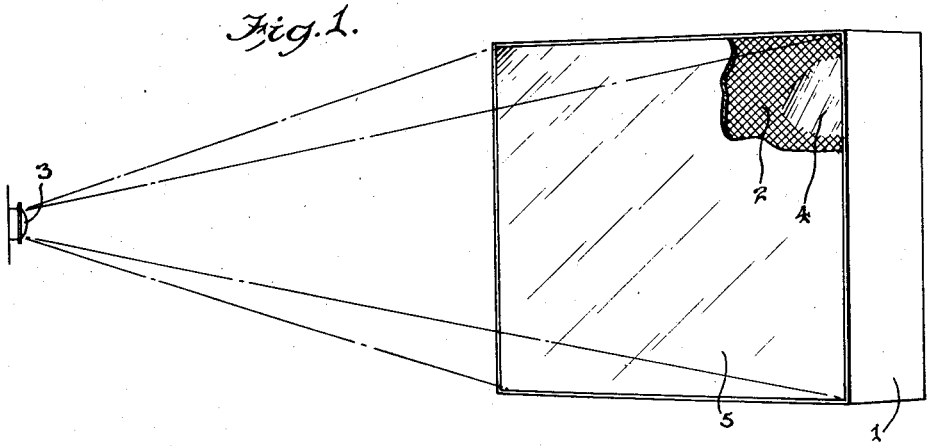
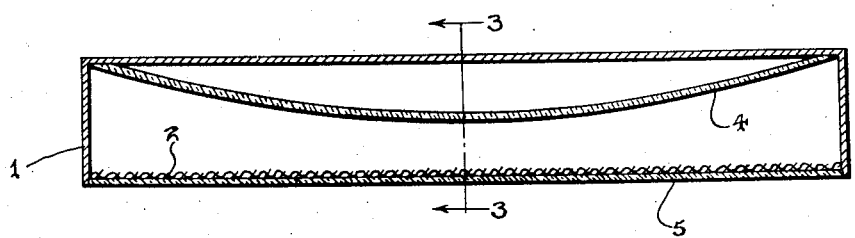
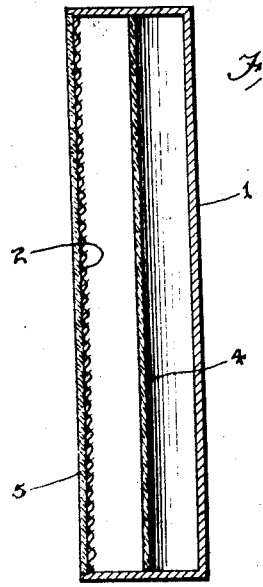
Inventor
Rafael Mendoza,
By Emil Bönnelycke
Attorney Patented Apr. 12, 1938

2,113,703

UNITED STATES PATENT OFFICE 2,113,703

PROJECTION SCREEN

Rafael Mendoza, Mexico, D. F., Mexico

Application April 21, 1936, Serial No. 75,631
In Mexico August 21, 1934

3 Claims. (Cl. 88—24)

This invention relates in general to motion picture apparatus and more particularly has reference to screens capable of imparting an optical illusion of depth to images projected thereon.

This application is a continuation-in-part of my copending application, Serial No. 753,030, filed November 14, 1934.

An object of this invention is to provide a screen composed of a translucent screen or curtain on which an image is projected and a mirror spaced behind the translucent screen or curtain to reflect the image appearing on said translucent screen.

Another object of this invention is to provide a composite screen formed of a netting and a semi-cylindrical reflecting mirror spaced behind the netting a distance sufficient to produce the stereoscopic effect of depth or relief to the image.

Still another object of this invention is to provide a composite projection screen formed of a glass plate having a fine mesh cloth arranged in contact with one surface thereof and a reflecting mirror spaced behind said plate a distance sufficient to impart an optical illusion of depth or relief to an image projected on said cloth.

With these and other important objects in view, which may be incident to my improvements, the invention resides in the parts and combinations to be hereinafter set forth and claimed, with the understanding that the several necessary elements comprising my invention may be varied in construction, proportions and arrangement, without departing from the spirit and scope of the appended claims.

In order to more clearly describe my invention, reference will be made to the accompanying drawing in which:

Fig. 1 is a perspective view of a motion picture screen constructed in accordance with the present invention.

Fig. 2 is a horizontal sectional view of the screen shown in Fig. 1.

Fig. 3 is a vertical sectional view taken on line 3—3 of Fig. 2.

The present invention is based on the concept of forming two images, one laterally offset relatively to the other, so that when viewed by a person an impression of relief or depth of the combined images will be obtained.

This effect is similar to that produced with a stereoscope. According to the present invention a screen or curtain is provided for the reception of an image projected by a motion picture projector, and a mirror is provided behind the screen or curtain to reflect the screen image. When the observer looks at the screen, he sees the image projected thereon and a second image, which is the reflection of the screen image in the mirror. The reflected image is of substantially the same size and intensity as the screen image, but appears to be offset relative to the screen image. When the observer focuses one eye on the screen image and the other eye on the reflected image, he sees the relief or depth phenomenon.

As shown in the drawing, the composite screen is positioned in a housing or frame 1 and comprises a cloth screen or curtain 2, upon which images are projected from the projector 3, and a mirror 4 for reflecting the image projected on the screen 2. The mirror 4 may be formed of polished glass with a coating of silver on the rear thereof or may be of other construction, the important factor being that a reflected image of high intensity be obtained.

The screen or curtain 2 may be formed of fabric or other material, provided it has transparent and translucent parts.

Now, if the transparent parts of the curtain are not too narrow and if the two images are placed in the proper direction, then with a little effort on the part of the observer the two images will blend and instead of two separate images only one will be seen in relief.

If the transparent parts of the screen or curtain 2 are very small and the translucent parts are predominant, then two images will be seen, which will not blend into one single image, and if the curtain is very near the mirror, the projection will be seen as the photographs made on glass and illuminated from behind.

If, on the contrary, the transparent parts are larger than the translucent parts, the second image will be seen behind, but will not blend with the first image, whereby the images will be seen very incompletely (the projection will be seen in the mirror).

Applicant has found that cloth, such as is used in flour bolting machines, serves very satisfactorily as material for the screen or curtain 2.

The screen or curtain 2 is spaced from the mirror a distance proportional to the size of the sceen or the objects in the image projected on the screen. For example, when the screen is 80 centimeters high and 100 centimeters long, the mirror should be spaced behind the same a distance of about 10 to 20 centimeters. In a case where the screen is of a size of about 5 meters long and 4 meters high, the space between the screen and mirror should be about 50 to 100 centimeters. While the best results are obtained when the screen is spaced from the mirror, as indicated above, it should be realized that the relief phenomenon can be obtained when the distance is slightly varied.

While the present invention may be carried out by employing either plane or curved mirrors, it has been found that more satisfactory results are obtained when a curved mirror is employed, as shown in the drawing. This curved mirror has the form of a portion of a cylindrical surface, the axis of which is vertical. The radius of this cylindrical surface should be so selected that the side edges of the mirror are spaced from the plane screen or curtain 2 a distance twice as great as the distance between the center of the screen and mirror.

For example, it has been found that for a screen of about 100 by 80 centimeters, the central portion of the mirror should be spaced about 10 to 15 centimeters from the screen and that the lateral edges of the mirror should be spaced about 20 to 30 centimeters from the screen. These values have given satisfactory results, but it should be clear that results may be obtained by departing slightly from these values.

From the foregoing it will be realized that the spacing between the screen and mirror may be roughly estimated as about 10 to 30% of the length of the screen.

By positioning a sheet of plane glass 5 in front of the cloth screen or curtain 2, it has been found that the effects obtained are better and that protection is afforded the cloth screen 2 and the mirror 4.

The film to be projected must be made with large contrasts of chiaroscuro, as the light parts of the second image will be seen through the dark parts of the first image, thus producing the effect of relief.

As the image of the lamp of the projector is also projected on the mirror, said image may be left, or eliminated according to the figures projected, by simply inclining the mirror accordingly, as in some projections the sensation of relief is enhanced by the lamp being visible.

In the foregoing description, specific values have been given for the relations between the spacing of the mirror from the curtain or screen and the length of the screen, but it should be realized that these relations may be varied, provided the image in the mirror appears behind and offset relative to the image on the curtain or screen.

The length of the screen has been used in comparing the spacing between the screen and mirror merely as a convenience, as it is presumed that the screen is of such size that the length thereof is about 10% greater than the height thereof.

While I have shown and described the preferred embodiment of my invention, I wish it to be understood that I do not confine myself to the precise details herein set forth by way of illustration, as it is apparent that many changes and variations may be made therein by those skilled in the art, without departing from the spirit of the invention or exceeding the scope of the appended claims.

I claim:—

1. A motion picture projection screen, comprising a front curtain having translucent and transparent parts for receiving a projected image, and a slightly convexly curved mirror positioned behind said curtain, said mirror being formed as a portion of a cylindrical surface generated about a vertical axis and being spaced behind said curtain in close proximity thereto sufficient to reflect a virtual image of the same orientation as the projected image and slightly narrowed relatively to the image on the curtain to produce with the curtain image a composite image exhibiting an apparent pseudo-stereoscopic effect, and said mirror having a radius of curvature such that the vertical side edges are spaced from the curtain a distance substantially twice as great as the distance between the center of the mirror and the curtain.

2. A motion picture projection screen, comprising a front curtain having translucent and transparent parts for receiving a projected image, and a slightly convexly curved mirror positioned behind said curtain, said mirror being formed as a portion of a cylindrical surface generated about a vertical axis and being spaced behind said curtain in close proximity thereto sufficient to reflect a virtual image of the same orientation as the projected image and slightly narrowed relatively to the image on the curtain to produce with the curtain image a composite image exhibiting an apparent pseudo-stereoscopic effect, the space between said mirror and curtain at the center thereof being approximately equal to 10 to 15% of the horizontal length of said curtain.

3. A motion picture projection screen, comprising a front curtain having translucent and transparent parts for receiving a projected image, and a slightly convexly curved mirror positioned behind said curtain, said mirror being formed as a portion of a cylindrical surface generated about a vertical axis and being spaced behind said curtain in close proximity thereto sufficient to reflect a virtual image of the same orientation as the projected image and slightly narrowed relatively to the image on the curtain to produce with the curtain image a composite image exhibiting an apparent pseudo-stereoscopic effect, and said mirror having a radius of curvature such that the vertical side edges are spaced from the curtain a distance substantially twice as great as the distance between the center of the mirror and the curtain, the space between said mirror and curtain at the center thereof being approximately equal to 10 to 15% of the horizontal length of said curtain.

RAFAEL MENDOZA.